United States Patent
Freis

(10) Patent No.: US 9,488,210 B2
(45) Date of Patent: Nov. 8, 2016

(54) FLOW DRILL SCREW ASSEMBLY AND METHOD

(71) Applicant: FORD GLOBAL TECHNOLOGIES, LLC, Dearborn, MI (US)

(72) Inventor: Amanda Kay Freis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 14/501,149

(22) Filed: Sep. 30, 2014

(65) Prior Publication Data

US 2016/0091010 A1 Mar. 31, 2016

(51) Int. Cl.
*B23P 17/00* (2006.01)
*F16B 33/00* (2006.01)
*F16B 25/00* (2006.01)
*F16B 25/10* (2006.01)
*B21J 5/06* (2006.01)

(52) U.S. Cl.
CPC ......... *F16B 25/0021* (2013.01); *F16B 25/106* (2013.01); *B21J 5/066* (2013.01)

(58) Field of Classification Search
CPC .. F16B 25/0021; F16B 25/106; F16B 33/00; B23P 17/00
USPC ......... 411/371.2, 378, 387.1, 394; 29/525.11
See application file for complete search history.

(56) References Cited

U.S. PATENT DOCUMENTS

| | | | | |
|---|---|---|---|---|
| 3,156,152 A * | 11/1964 | Reed | ............ | F16B 15/06 411/386 |
| 3,286,579 A * | 11/1966 | Lovisek | ............ | F16B 25/0021 411/386 |
| 3,724,886 A * | 4/1973 | Widerby | ............ | E04B 1/617 411/417 |
| 4,473,140 A * | 9/1984 | Komori | ............ | F16B 19/04 188/234 |
| 4,516,893 A * | 5/1985 | Barth | ............ | F16B 25/0021 411/184 |
| 4,692,080 A * | 9/1987 | Hyner | ............ | F16B 25/0021 407/119 |
| 4,749,322 A * | 6/1988 | Sygnator | ............ | F16B 5/02 411/387.3 |
| 4,802,807 A * | 2/1989 | Offenburger | ............ | C23C 14/16 411/387.1 |
| 4,928,531 A * | 5/1990 | Schult | ............ | F16B 35/00 411/107 |
| 5,234,301 A * | 8/1993 | Grossberndt | ............ | B21J 5/066 411/386 |
| 5,356,253 A * | 10/1994 | Whitesell | ............ | F16B 25/0021 411/188 |
| 5,361,478 A * | 11/1994 | Grossberndt | ............ | B21J 5/066 29/432 |
| 5,487,633 A * | 1/1996 | Roberts | ............ | B21H 3/027 411/187 |
| 5,722,808 A * | 3/1998 | Pritchard | ............ | F16B 33/02 411/366.3 |

(Continued)

FOREIGN PATENT DOCUMENTS

CA 1196217 A 11/1985
CN 101381053 B 7/2012

(Continued)

OTHER PUBLICATIONS

English Machine translation of CN101381053.

(Continued)

*Primary Examiner* — Roberta Delisle
(74) *Attorney, Agent, or Firm* — Jason Rogers; King & Schickli, PLLC

(57) ABSTRACT

An assembly is provided including a first workpiece and a second workpiece that are positioned together. A groove is provided in an exposed face of one of the workpieces. A location is provided at the bottom of the groove having a reduced cross-sectional thickness. The flow drill screw is extended through this location when joining the workpieces together.

16 Claims, 4 Drawing Sheets

(56) References Cited

U.S. PATENT DOCUMENTS

| | | | | |
|---|---|---|---|---|
| 6,494,656 B1* | 12/2002 | Boyer | ................... | B21H 3/027 411/399 |
| 6,712,708 B2* | 3/2004 | Boyer | ................... | B21H 3/027 470/10 |
| 6,945,729 B2* | 9/2005 | Yasuda | .............. | F16B 25/0021 403/408.1 |
| 7,377,734 B2* | 5/2008 | Bechtel, Jr. | ............. | B21K 1/56 411/386 |
| 7,682,118 B2* | 3/2010 | Gong | ................ | F16B 25/0047 411/387.1 |
| 8,110,152 B2 | 2/2012 | Schultz et al. | | |
| 9,151,307 B2* | 10/2015 | Freis | ........................ | F16B 5/02 |
| 2010/0275669 A1 | 11/2010 | Vollet et al. | | |
| 2013/0195579 A1 | 8/2013 | Freis | | |
| 2013/0273312 A1 | 10/2013 | Campbell et al. | | |
| 2014/0069227 A1 | 3/2014 | Kawaguchi | | |

FOREIGN PATENT DOCUMENTS

| | | |
|---|---|---|
| DE | 102007012896 A1 | 9/2008 |
| DE | 102007022297 A1 | 11/2008 |
| EP | 2674715 A1 | 12/2013 |

OTHER PUBLICATIONS

English Machine translation of DE102007012896.
English Machine translation of DE102007022297.

* cited by examiner

FLOW DRILL SCREW ASSEMBLY AND METHOD

TECHNICAL FIELD

This document relates generally to the field of mechanical fastening and, more particularly, to a flow drill screw assembly and method.

BACKGROUND

Body in white structures often require one-sided joining techniques in order to create design efficient assemblies. One such technique is flow drill screwing (FDS) where a threaded fastener is screwed to a sheet-metal and/or extrusion joint and the "nut" is created in situ during the insertion process. When installing a flow drill screw S in thick gauge material stack ups or when the top layer of sheet material is greater than a governing size (e.g. greater than 3 mm), a clearance hole has been used in the past in the top sheet of material. This has been done because an upward flow of metal during screw insertion often forces a gap G between the layers $L_1$, $L_2$ of the joint (see FIG. 1). This gap G is mitigated with the presence of the clearance hole.

While a clearance hole will effectively solve the gapping problem, a clearance hole is undesirable because it (1) potentially weakens the joint, (2) introduces a stress concentration and (3) often requires a vision system during body assembly to ensure that the flow drill screw is inserted properly into the clearance hole.

United States Patent Application Publication No. 2013/0195579, assigned to Ford Global Technologies, LLC, discloses one possible approach for eliminating the need for the clearance hole. In accordance with the teachings of this document, an indentation or a void is provided in one of the workpieces to be joined with that indentation facing inwardly toward the other workpiece to be joined. The flow screw is then inserted through the indentation with the material being displaced into the indentation. While this approach is useful in that it eliminates the need for a clearance hole when fastening workpieces with a flow drill screw, it should be appreciated that an indentation formed in one workpiece facing toward the other workpiece that are being joined together cannot be readily detected visually or otherwise. Accordingly, the approach disclosed in the '579 document is not convenient and does not always allow the most efficient assembly in many situations.

This document relates to a new and improved flow drill screw assembly and method wherein one of the workpieces includes an exposed groove that may be more easily detected visually or by other means to ensure that the flow drill screw is properly positioned in order to complete the assembly.

SUMMARY

In accordance with the purposes and benefits described herein, a new and improved assembly is provided comprising (a) first workpiece including a first face and a second face, (b) a second workpiece including a third face and (c) a fourth face and a flow drill screw. The first and second workpieces are positioned together with the second face abutting the third face. A groove is provided in at least one of the first face and the fourth face whereby workpiece material at a bottom of the groove is characterized by a location of reduced cross-sectional thickness. The flow drill screw is extended through that location in order to secure the first and second workpieces together.

The flow drill screw includes a head and a tip. In one possible embodiment the groove is provided in the first face and the head of the flow drill screw abuts the first face. In another possible embodiment the groove is provided in the fourth face and the head of the screw abuts the first face. In one possible embodiment, the location at the bottom of the groove is void of any clearance hole. In one possible embodiment, the groove is void of any clearance hole. In one possible embodiment, the first workpiece and the second workpiece are void of any clearance hole. In yet another possible embodiment, a third workpiece provided between the second face of the first workpiece and the third face of the second workpiece.

In accordance with an additional aspect, a method is provided for fastening a plurality of workpieces together to form an assembly. That method may be broadly described as including the steps of: (1) forming a groove in a face of a first workpiece, (2) positioning a second workpiece into engagement with the first workpiece so as to not cover the groove thereby leaving the groove exposed to view and (3) inserting a flow drill screw into the first and second workpieces so that the flow drill screw extends through the groove. The method may further include visually locating the groove before inserting the flow drill screw.

Still further the method may include using the first workpiece to form a front side of the assembly. In another embodiment the method may include using the first workpiece to form a rear side of the assembly.

In addition, the method may include forming the groove by machining. In another embodiment, the method may include forming the groove by coining. In any of the embodiments the method may include providing a location of the first workpiece with an area of reduced cross-sectional thickness at a bottom of the groove. This is then followed by driving the flow drill screw through that location to assemble the workpieces together.

In the following description, there are shown and described several preferred embodiments of the assembly and related method. As it should be realized, the assembly and method are capable of other, different embodiments and their several details are capable of modification in various, obvious aspects all without departing from the assembly and method as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the assembly and method and together with the description serve to explain certain principles thereof. In the drawing.

Reference will now be made in detail to the present preferred embodiments of the assembly, examples of which are illustrated in the accompanying drawing figures.

DETAILED DESCRIPTION

Figure 1:
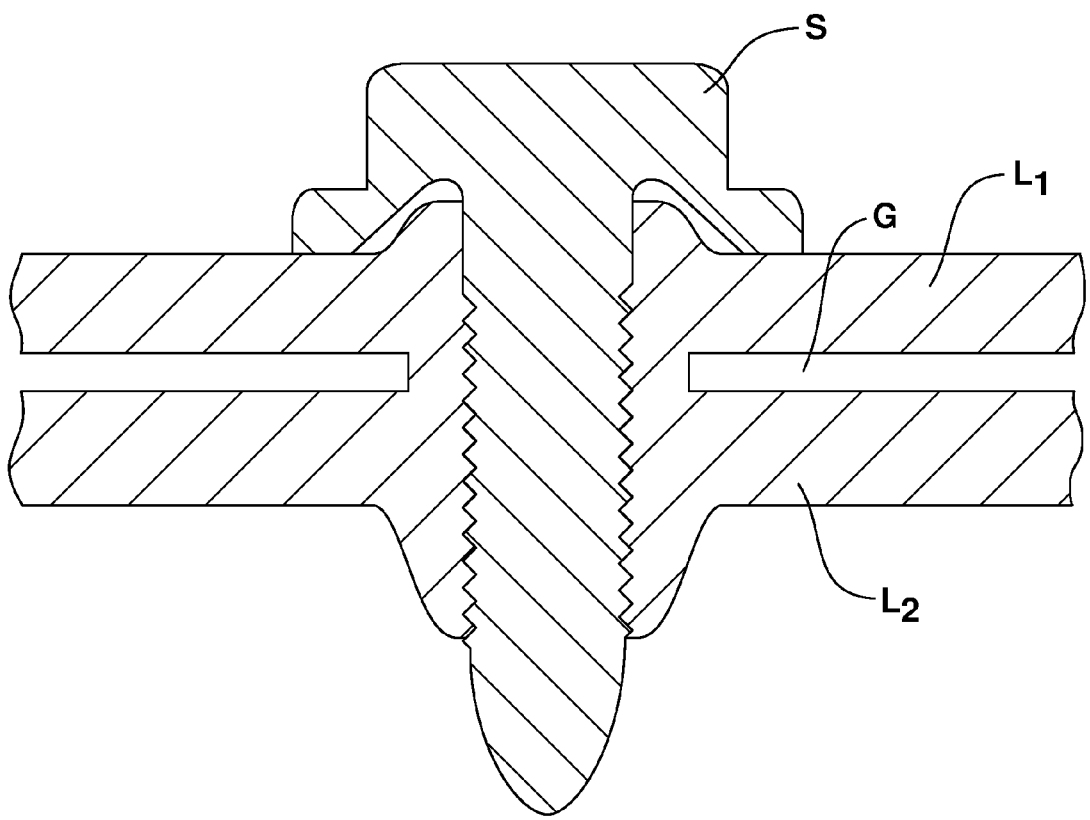
FIG. 1 is a prior art illustration of how the lack of a clearance hole can lead to the formation of a gap when inserting a flow drill screw through workpieces of a certain thickness.
Figure 2:
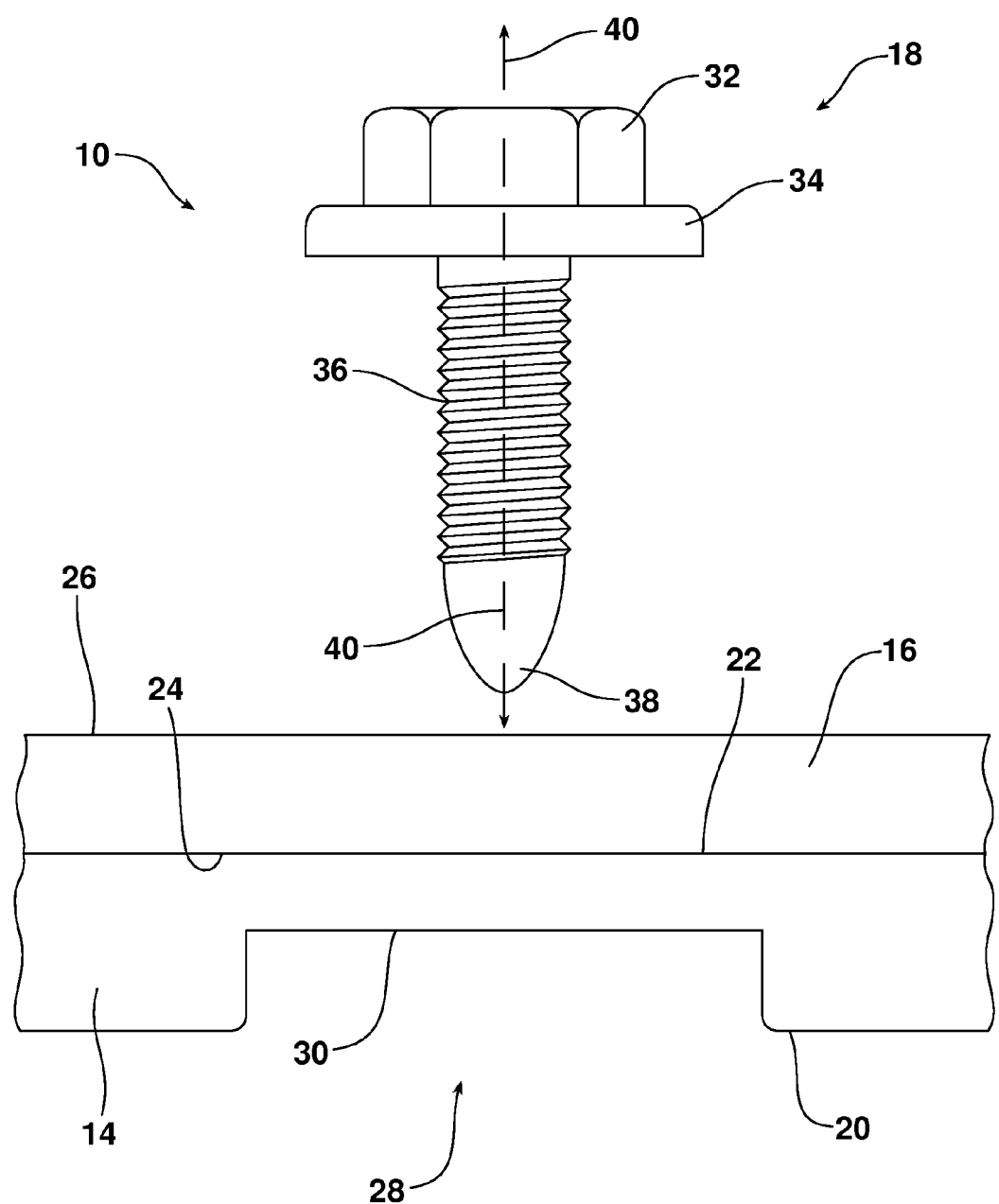
FIG. 2 is a schematical side elevational view of a pre-assembly incorporating two workpieces and a flow drill screw.
Figure 3:
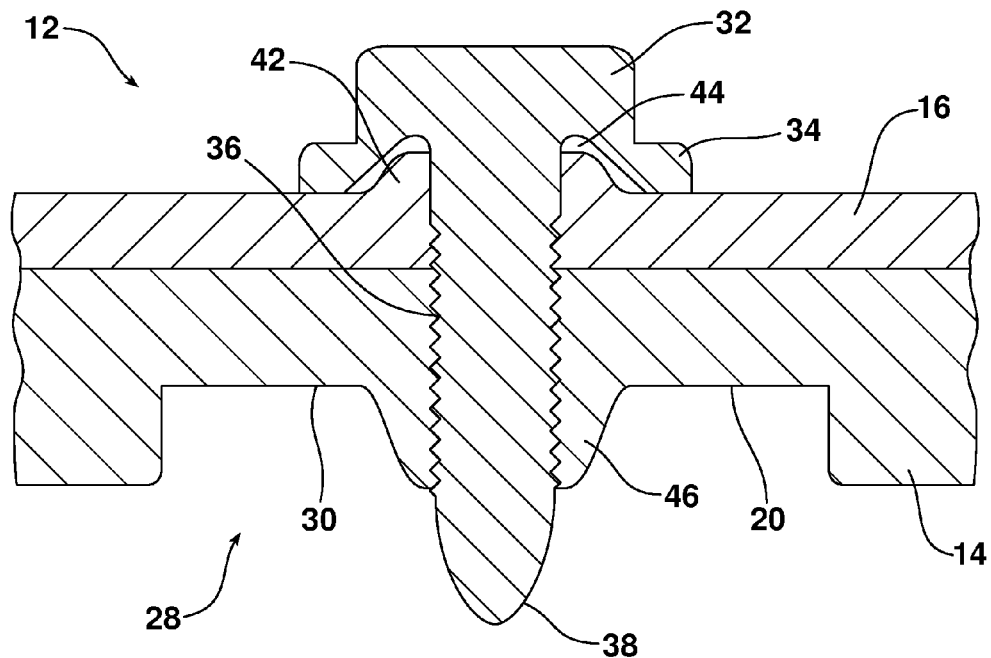
FIG. 3 illustrates the pre-assembly of FIG. 2 now assembled by insertion of the flow drill screw.

Reference is now made to FIGS. 2 and 3 illustrating respectively, a pre-assembly 10 and a first embodiment of the flow drill screw assembly 12. As illustrated in FIG. 2, the flow drill assembly 12 is made from the pre-assembly 10 incorporating a first workpiece 14, a second workpiece 16 and a flow drill screw 18.

The first workpiece 14 includes a first face 20 and a second face 22. The second workpiece 16 includes a third face 24 and a fourth face 26. A groove 28 is formed in the first face 20 of the first workpiece 14. As should be appreciated, a location 30 of reduced cross-sectional thickness is provided in the first workpiece at the bottom of the groove 28.

The flow drill screw includes a head 32, an integrated washer 34, a threaded shaft 36 and a screw tip 38. The head 32, integrated washer 34, threaded shaft 36 and screw tip 38 are all aligned along a rotational axis 40 about which the flow drill screw 18 is rotated during insertion into the workpieces 14, 16 which are positioned so that the second and third faces 22, 24 are abutting.

During assembly, the flow drill screw 18 is properly oriented with the rotational axis 40 overlying the location 30. The flow drill screw 18 is then inserted into the workpieces 14, 16 utilizing appropriate flow screw drilling equipment. During insertion, reverse flow material 42 is received and held in the cavity 44 under the flow drill screw head 32 (see FIG. 3). Forward flow material 46 flows outwardly from the first face 20 and effectively forming an in situ nut that holds the flow drill screw in position. Significantly, the reduced cross-sectional thickness of the first workpiece 14 at the flow drill screw location 30 eliminates the formation of any gap between the workpieces 14, 16 from flow material generated during the insertion process.

Figure 4:
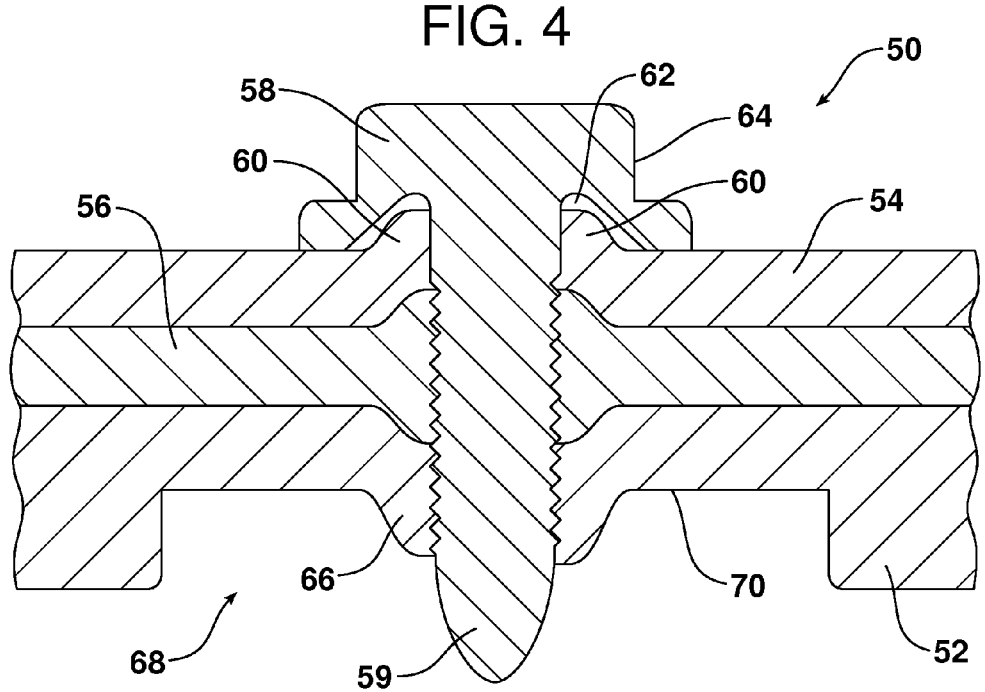
FIG. 4 illustrates an assembly incorporating three stacked workpieces.

Reference is now made to FIG. 4 illustrating a second embodiment of an assembly 50 including a first workpiece 52, a second workpiece 54 and a third, intermediate workpiece 56 all held together by a flow drill screw 58. As illustrated, the reverse flow material 60 is received and held in the cavity 62 under the flow drill screw head 64. In contrast, forward flow material 66 forms an in-situ nut in the groove 68. The flow drill screw 58 extends through the flow drill screw location 70 in the first workpiece 52 having a reduced thickness. As a result, the workpieces 52, 54, 56 are joined together without the formation of any flow material gaps therebetween.

Figure 5:
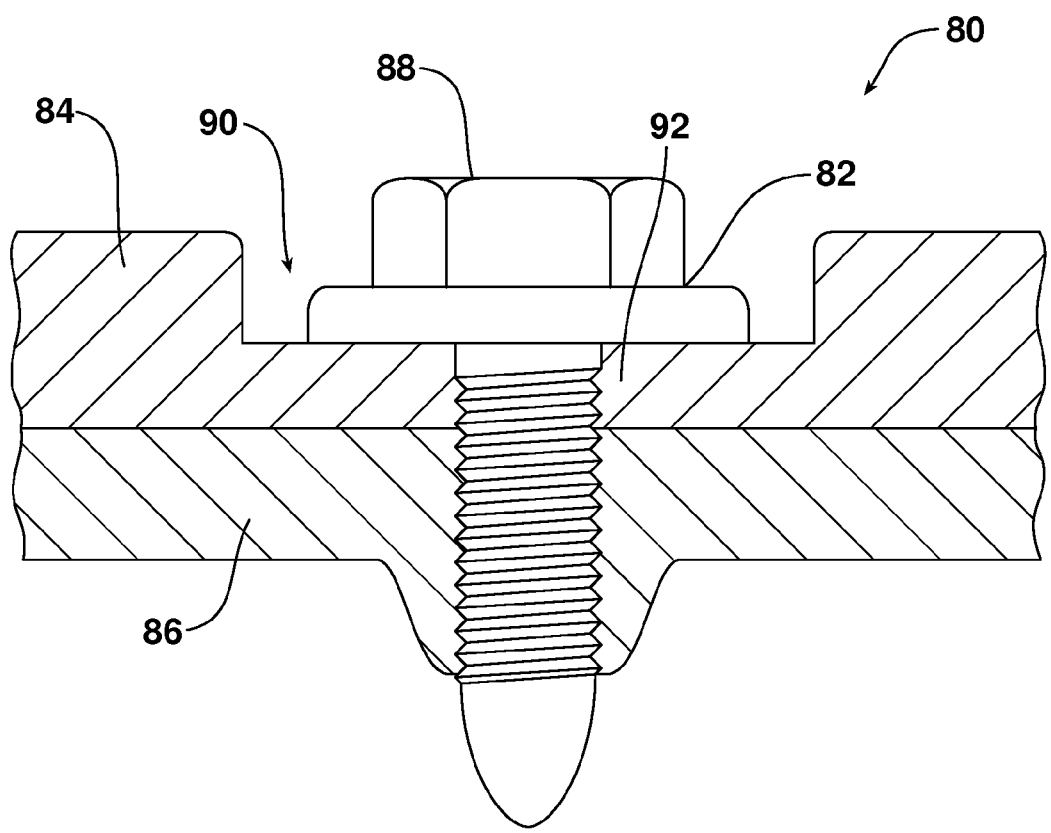
FIG. 5 is a side elevational view of an alternative assembly wherein the head of the flow drill screw is received in the groove.

Reference is now made to FIG. 5 illustrating yet another alternative embodiment of the flow drill screw assembly 80. In this embodiment, the flow drill screw 82 is inserted into the workpieces 84, 86 so that the head 88 of the screw is received in and held by the groove 90.

A method of fastening a plurality of workpieces together to form an assembly is also disclosed. This method includes forming a groove 28, 68, 90 by machining, coining or other means in a face of a first workpiece 14, 52, 84. The method also includes assembling a second workpiece 16, 54, 86 into engagement with the first workpiece 14, 52, 84 so as to not cover the groove 28, 68, 90 thereby leaving the groove exposed to view. Next the method includes inserting a flow drill screw 18, 58, 82 into the first and second workpieces 14, 16 or 52, 54 or 84, 86 so that the flow drill screw extends through the groove 28, 68 or 90.

As should be appreciated, the groove 28, 68, 90 is provided on an exposed face 18 of one of the workpieces 14, 52 or 84. The groove 28, 68, 90 is not provided on an internal, juxtaposed face of the workpieces where it is hidden. As a result it is possible to visually locate the groove 28, 68, 90 before inserting the flow drill screw 18, 58, 82.

In accordance with one aspect, the method may include using the first workpiece 14 to form a front side of the assembly 80 with the head 88 of the flow drill screw 82 received in the groove 90 as illustrated in FIG. 5. In accordance with another embodiment of the method, the first workpiece 52 is used to form the rear side of the assembly 50 so that the screw tip 59 extends or projects from the bottom of the groove 28 (see FIG. 4). In either of these embodiments, the method includes providing a location 70 or 92 on the first workpiece 52, 84 with an area of reduced cross-sectional thickness at a bottom of the groove 68, 90. This location 68, 90 of reduced cross-sectional thickness reduces the amount of flow material that must be accommodated during the assembly operation and effectively prevents the formation of gaps between the workpieces due to this flow material.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of fastening a plurality of workpieces together to form an assembly, comprising:
    forming a groove in a face of a first workpiece;
    positioning a second workpiece into engagement with said first workpiece so as to not cover said groove thereby leaving said groove exposed to view;
    providing a location of said first workpiece with an area of reduced cross-sectional thickness at a bottom of said groove; and
    inserting a flow drill screw into said first and second workpieces so that said flow drill screw extends through said groove.

2. The method of claim 1, including visually locating said groove before inserting said flow drill screw.

3. The method of claim 2, including using said first workpiece to form a front side of said assembly.

4. The method of claim 2, including using said first workpiece to form a rear side of said assembly.

5. The method of claim 1, including forming said groove by machining.

6. The method of claim 1, including forming said groove by coining.

7. The method of claim 1, including driving said flow drill screw through said location.

8. An assembly, comprising:
    a first workpiece including a first face and a second face;
    a second workpiece including a third face and a fourth face wherein said first and second workpieces are positioned together with said second face abutting said third face;
    a groove provided in at least one of said first face and said fourth face whereby workpiece material at a bottom of said groove is characterized by a location of reduced cross-sectional thickness; and a flow drill screw extending through said location and securing said first and second workpieces together.

9. The assembly of claim 8, wherein said flow drill screw includes a head and a tip.

10. The assembly of claim 9, wherein said groove is in said first face and said head of said flow drill screw abuts said first face.

11. The assembly of claim 9, wherein said groove is in said fourth face and said head of said screw abuts said first face.

12. The assembly of claim 8, wherein said location is void of any clearance hole.

13. The assembly of claim 8, wherein said groove is void of any clearance hole.

14. The assembly of claim 8, wherein said first workpiece and said second workpiece are void of any clearance hole.

15. The assembly of claim 8, further including a third workpiece provided between said second face of said first workpiece and said third face of said second workpiece.

16. An assembly, comprising:

a first workpiece including a first face and a second face;

a second workpiece including a third face and a fourth face wherein said first and second workpieces are positioned together with said second face abutting said third face along an entirety of the second and third faces;

a groove provided in at least one of said first face and said fourth face whereby workpiece material at a bottom of said groove is characterized by a location of reduced cross-sectional thickness; and a flow drill screw extending through said location and securing said first and second workpieces together.

* * * * *